J. J. BAILEY.
DEVICE FOR DISTRIBUTING SEED AND THE LIKE.
APPLICATION FILED DEC. 15, 1919.
1,383,281.
Patented July 5, 1921.
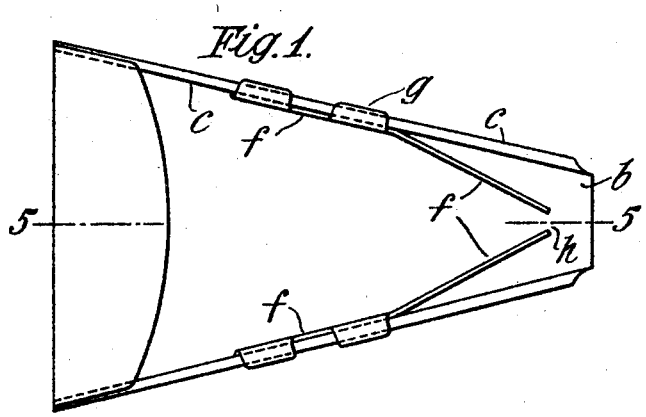
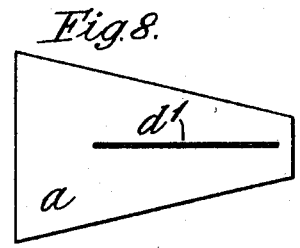
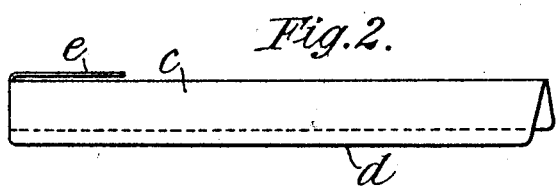
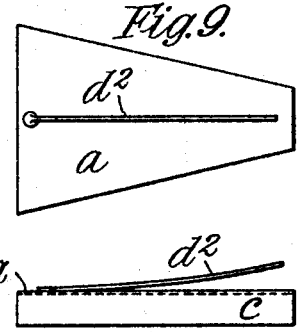
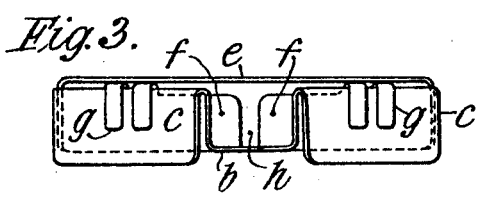
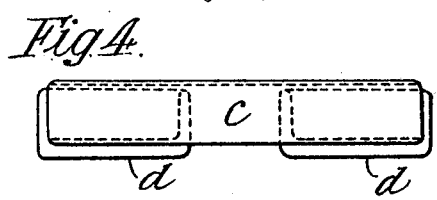
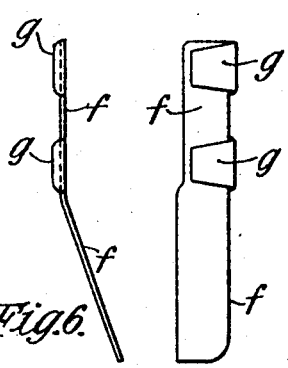
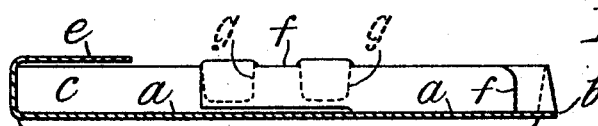
Inventor:
John James Bailey
by C. Barnard Burdon
Attorney.

UNITED STATES PATENT OFFICE.

JOHN JAMES BAILEY, OF HARPENDEN, ENGLAND.

DEVICE FOR DISTRIBUTING SEED AND THE LIKE.

1,383,281. Specification of Letters Patent. Patented July 5, 1921.

Application filed December 15, 1919. Serial No. 344,987.

*To all whom it may concern:*

Be it known that I, JOHN JAMES BAILEY, L. D. S., R. C. S., a subject of the King of Great Britain, residing at "Chilworth," Clarence Road, Harpenden, in the county of Herts, England, have invented certain new and useful Improvements in Devices for Distributing Seed and the like, of which the following is a specification.

This invention has reference to devices for distributing seed and the like, and is designed to provide a simple and convenient device which shall enable seed to be distributed evenly along drills, the contents of the device being always under full observation and easy control, and the rates of distribution being capable of being regulated.

It will also serve in all cases where granular or small particles are to be distributed evenly, and although principally intended for seed sowing, may also be used for distributing small quantities of fertilizers or other compounds.

The device may be made in the form of a small flat scoop which may be wedge-shaped, or be tapered or contracted toward its outlet end or mouth, and means are provided whereby when the device is drawn sidewise lightly along or rubbed against a cord or line such as used as a guide in making the drill, or along a rod or stick for the same purpose, it will be thrown into a vibrating or trembling motion or dither, and the seeds will fall from it evenly when it is tilted at a slight angle. This action may be set up by one or more ribs or flanges with rather rough or sharp edges, like scrapers, provided for example at each side below the bottom of the device or otherwise. In some cases a spring or vibrating tongue may be secured centrally under the device and so arranged that its tip will scrape or rub against the cord, rod or other guide (as the device is moved along sidewise) and so set up the required vibration or dither, such guide being somewhat rough or of such a nature as to give a suitable slight grip.

An inner division consisting of two adjustable flexible tongues, blades or vanes may be secured to, or near to, the sides of the scoop, and extend across the latter, the vanes converging till their ends are only a short distance apart. This forms a V-shaped funnel, regulator or check device for small round seeds or particles which might tend to run out too quickly.

By bending the vanes or regulators, or by setting them at different points along the walls of the device, the distance between the converging ends can be altered to regulate the size of the outlet and the rate of delivery.

The vanes or blades may be detachable and have clips, tongues or other fastenings which can be easily secured to the sides of the scoop at any desired position of adjustment, and the distance between their tips can also be varied by setting them farther forward or backward along the inclined sides or walls of the device.

In order that the invention may be clearly understood and readily carried into effect reference will now be had by way of example to the accompanying drawings in which:—

Figure 1 is a plan of one example of the device.

Fig. 2 is a side view,

Fig. 3 a front view, and

Fig. 4 a rear end view thereof, while

Fig. 5 is a longitudinal section on the line 5—5, Fig. 1.

Figs. 6 and 7 are respectively a plan and top edge view and a side view of one of the vanes or regulator blades.

Fig. 8 is an under-side view to a smaller scale of a device with a single scraper edge or rib in the middle.

Fig. 9 is a similar underside view of a device having a spring blade instead of a rib, Fig. 10 being an inverted side view of the same.

*a* is the body of the distributer device which in plan resembles a wedge with its point or tip cut off transversely at the mouth or outlet *b*.

It has a raised edge *c* or wall all around the rear and sides so that it will form a receptacle for seed or the like, this edge being doubled over on itself. The doubled or folded-over part is extended downward to produce the scraper-like flanges *d*. It will be seen that such a device will stand properly when placed on the ground, as the two side flanges form rests for the same and keep the body part slightly raised from the ground.

By scraping one or both of the edges along a cord, such as usually placed along a seed drill or other guiding edge, the device is thrown into a dither or jarring state and any seed or particles are actuated and caused to travel down it when it is slightly inclined and fall out evenly, as they will do if a scoop be tapped or jerked, instead of falling in separate small masses and given a patchy distribution.

A distributer may be made of thin sheet tin, waxed and prepared paper or cardboard, celluloid or other suitable metal or material.

The rear or wide end of the scoop may have a small cover plate $e$ extending across it. This will form a pocket or receptacle for seeds when the device is held point upward.

$f$ are the adjustable vanes or regulator blades which are adjustably secured to the sides of the device by clips or bent over lugs $g$. Each consists of a straight part to fit against the side wall, and an off-set or inclined part, which can be bent more or less to vary the outlet opening $h$ between the tips of the vanes. The straight part (see Fig. 7) may be a little narrower than the bent part, because the bottom corner or angle of the wall $c$ is usually slightly curved, and would obstruct the bottom edge of the vane if the latter were made of the full depth all the way along. By removing part of its bottom edge, it can fit down properly so that the clips press against the top or bent over edge of the wall $c$.

When these converging vanes or tongues are not required they can be detached and re-fixed to the opposite sides in the reverse position, so that they lie out of the way below the above mentioned cover plate $e$ at the rear end.

The bottom of the scoop-like device, especially for large seeds, may if desired be provided with a depression or well near its rear end. It may also be roughened or ribbed to act as a slight check to the downward travel of the seeds.

The devices may be arranged in sets, for instance of three, to pack inside each other, the different devices having different arrangements such as above referred to, so that while one is suitable for one kind of seed the others will serve for other kinds.

Obviously the invention may be modified in various ways in carrying the same into practice without departing from the general nature thereof.

Thus it may have only a single central rib or scraper $d^1$ as in Fig. 8, or a spring blade or wire $d^2$ as in Figs. 9 and 10 for setting up the vibration or dither when it is drawn or scraped along a cord or stock, or along an edge or guide which will set up a similar action.

I claim:—

1. A hand distributer or like device comprising a scoop-shaped body, a rubbing or scraping edge beneath said body, an overlapping piece at the wider rear end of said body to form a pocket, and regulator vanes to control the travel of the contents along the bottom of the scoop, substantially as described.

2. In a hand distributing device for seeds or granular material, the combination of a wedge-shaped scoop with a contracted mouth, folded-over sides whose outer edges project below the bottom of the scoop and form scrapers, a cover for the wider rear part, of said body, and adjustable baffle vanes to regulate the travel of the contents along the bottom of the device, substantially as described.

3. In a distributer device, the combination of a sheet-metal body, turned-down side walls converging toward the mouth of the device, flexible baffles extending from opposite sides of the device, and clips on said baffles for adjustably securing them to the said sides, substantially as described.

In testimony whereof I affix my signature.

JOHN JAMES BAILEY.